US008874373B2

(12) United States Patent
Nakamura et al.

(10) Patent No.: US 8,874,373 B2
(45) Date of Patent: Oct. 28, 2014

(54) MAP INFORMATION DELIVERY SYSTEM, METHOD, AND PROGRAM

(75) Inventors: Norihiro Nakamura, Toyokawa (JP); Hironobu Sugimoto, Toyota (JP); Tomoki Kodan, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 381 days.

(21) Appl. No.: 12/923,825

(22) Filed: Oct. 8, 2010

(65) Prior Publication Data

US 2011/0029228 A1 Feb. 3, 2011

Related U.S. Application Data

(62) Division of application No. 11/812,914, filed on Jun. 22, 2007.

(30) Foreign Application Priority Data

Jun. 23, 2006 (JP) ................................ 2006-174560

(51) Int. Cl.
*G01C 21/00* (2006.01)
*G01C 21/32* (2006.01)

(52) U.S. Cl.
CPC ....................................... *G01C 21/32* (2013.01)
USPC ........... 701/532; 701/400; 701/409; 701/461; 701/462; 340/995.1; 340/995.11; 340/995.12; 340/995.14; 340/995.18

(58) Field of Classification Search
CPC .. G01C 21/32; G01C 21/367; G01C 21/3667; G01C 21/3673; G01C 21/3682; G08G 1/096811; G08G 1/096816; G08G 1/096822; G08G 1/096844

USPC ......................... 701/400, 409, 461, 462, 532; 340/995.1–995.12, 995.14, 995.18
See application file for complete search history.

(56) References Cited

U.S. PATENT DOCUMENTS

| 6,075,467 A  | * | 6/2000 | Ninagawa ................. 340/995.14 |
| 6,507,783 B2 |   | 1/2003 | Katayama et al. |
| 6,532,417 B2 | * | 3/2003 | Hatano ......................... 701/420 |
| 6,643,584 B1 | * | 11/2003 | Ikeuchi et al. ................ 701/410 |
| 6,658,351 B2 |   | 12/2003 | Seto et al. |
| 6,675,092 B1 |   | 1/2004 | Katayama et al. |
| 6,937,936 B2 | * | 8/2005 | Nimura ......................... 701/421 |

(Continued)

FOREIGN PATENT DOCUMENTS

| EP | 1 657 526 A2 | 5/2006 |
| EP | 1 785 968 A1 | 5/2007 |

(Continued)

OTHER PUBLICATIONS

Jan. 21, 2011 Office Action issued in U.S. Appl. No. 11/812,914.

(Continued)

*Primary Examiner* — Jack W Keith
*Assistant Examiner* — Chuong P Nguyen
(74) *Attorney, Agent, or Firm* — Oliff PLC

(57) ABSTRACT

A map information delivery system, including a navigation apparatus, is capable of preferentially receiving map updating information based on a host vehicle's state. The updating information may be preferentially received based on whether a destination has been set, a location of the updating information relative to an updating position or a destination, and/or the size of the updating information.

3 Claims, 10 Drawing Sheets

(56) References Cited

U.S. PATENT DOCUMENTS

| | | | |
|---|---|---|---|
| 8,055,620 B2* | 11/2011 | Nakamura et al. | 707/638 |
| 8,055,621 B2* | 11/2011 | Nakamura et al. | 707/638 |
| 8,392,367 B2* | 3/2013 | Moribe et al. | 707/634 |
| 2001/0004724 A1 | 6/2001 | Nagaki | |
| 2003/0028316 A1 | 2/2003 | Miyahara | |
| 2003/0065440 A1* | 4/2003 | Oda et al. | 701/202 |
| 2003/0220735 A1* | 11/2003 | Nimura | 701/208 |
| 2004/0117110 A1 | 6/2004 | Sasajima | |
| 2004/0193370 A1 | 9/2004 | Umezu et al. | |
| 2004/0204824 A1* | 10/2004 | Naito et al. | 701/200 |
| 2004/0212627 A1 | 10/2004 | Sumizawa et al. | |
| 2006/0095202 A1* | 5/2006 | Atarashi et al. | 701/208 |
| 2006/0173614 A1* | 8/2006 | Nomura | 701/210 |
| 2006/0178817 A1 | 8/2006 | Suzuki et al. | |
| 2006/0190507 A1 | 8/2006 | Sekine et al. | |
| 2007/0244636 A1* | 10/2007 | Horikami | 701/208 |
| 2007/0282524 A1* | 12/2007 | Tanizaki et al. | 701/208 |

FOREIGN PATENT DOCUMENTS

| | | | |
|---|---|---|---|
| JP | A 2000-180187 | 6/2000 | |
| WO | WO-2006/008826 A1 * | 1/2006 | G01C 21/26 |
| WO | WO 2006008826 A1 | 1/2006 | |
| WO | WO 2006/011278 A1 | 2/2006 | |

OTHER PUBLICATIONS

Feb. 11, 2013 Office Action issued in U.S. Appl. No. 11/812,914.
Aug. 26, 2013 Office Action issued in U.S. Appl. No. 11/812,914.

* cited by examiner

AREA AROUND DESTINATION

US 8,874,373 B2

MAP INFORMATION DELIVERY SYSTEM, METHOD, AND PROGRAM

INCORPORATION BY REFERENCE

This application is a division of U.S. application Ser. No. 11/812,914, filed Jun. 22, 2007, and claims priority to Japanese Patent Application No. 2006-174560, filed on Jun. 23, 2006. The prior applications, including the specifications, drawings and abstracts are incorporated herein by reference in their entirety.

BACKGROUND

1. Related Technical Fields

Related technical fields include map information delivery systems and, in particular, map information delivery system which deliver updating information for updating the map information from a map information delivery center to a navigation apparatus.

2. Related Art

Navigation apparatuses are increasingly being installed in vehicles. Such a navigation apparatus is structured to detect a current position of a vehicle using a GPS receiver. The apparatus to obtains map data corresponding to the current position from a recording medium such as a DVD-ROM and HDD, or a network. Then, the apparatus displays the obtained map data on a liquid crystal monitor. The obtained map data, which contains the current position of the vehicle, is loaded from the recording medium to form a map image showing an area around the current position of the vehicle on a display unit. A vehicle position mark may be superimposed on the map image and the map image may be scrolled as the vehicle travels. The position mark also allows the driver to easily identify the vehicle position on the map image.

As roads are newly built every year, old roads are closed, or the configuration of the existing road is changed. It is therefore necessary to update the map data stored in the navigation apparatus at a predetermined time interval. Updating of the map data is performed by replacing an old DVD with a newly purchased DVD, writing the map data into the HDD in a shop, and/or rewriting the contents of the HDD based on the map data delivered from a map information delivery center.

Japanese Patent Application Publication No. JP-A-2000-180187 (paragraphs [0014] to [0098], FIGS. 1 to 18) discloses a map information delivery system including a map information delivery center and a navigation apparatus. The navigation apparatus may include a control unit for displaying on a display unit reception data received from the map information delivery center via wireless communication. The navigation apparatus may include a memory unit that stores map information and/or identification information of available map information, and a detection unit that detects a current position of the host vehicle and a traveling direction of the host vehicle. The control unit automatically receives the map information during the wireless communication with the map information delivery center, and thereby updates or adds to the map information stored in the memory unit. The navigation apparatus allocates priorities to the map information near the current position of the host vehicle detected by the detection unit, the map information with the detailed scale, the map information with the same scale as that of the map currently displayed on the display, the map information showing the area in the traveling direction of the host vehicle detected by the detection unit, and the map information capable of updating the oldest map information stored in the memory unit, in that order. The map information is required in the aforementioned priority order.

SUMMARY

In the map information delivery system disclosed in Japanese Patent Application Publication No. JP-A-2000-180187, however, the priority order of the updating information for updating the map information cannot be changed in accordance with the state of the host vehicle (e.g., a state in which the host vehicle begins driving after setting the destination in the navigation apparatus and a state in which the host vehicle begins driving without setting the destination in the navigation apparatus). That is, the updating information suitable for the state of the host vehicle cannot be preferentially received. In the case where the data size of the updating information is too large to update the information in the navigation apparatus within a predetermined time period (e.g., from about 20 to about 35 seconds), the driver is required to wait until the displayed map is updated.

Thus, an object of various exemplary implementations of the broad principles described herein is to provide a map information delivery system capable of preferentially receiving the updating information based on the host vehicle's state. For example, if the data size of the updating information is too large to be used in the navigation apparatus within a predetermined time period (e.g., from about 20 to about 35 seconds), the map may be sequentially updated to provide the effective map information quickly during traveling of the host vehicle.

Exemplary implementations provide a navigation apparatus for a vehicle that is useable in a map information delivery system. The navigation apparatus may include a memory that stores map data, a communication unit that communicates with a map information delivery center, and a controller.

If no destination is set in the navigation apparatus, the apparatus may determine an updating position, detect a state of the vehicle, and determine a first area having the updating position at a center. The apparatus may transmits a first area updating request requesting entire first area road segment updating information corresponding to the first area to the map information delivery center, receive the first area road segment updating information, and update map information based the first area road segment updating information as it is received according to the priority.

Then, the apparatus may transmit a high-standard road segment updating request requesting high-standard road segment updating information corresponding to an entire area of the map information to the map information delivery center, receive the high-standard road segment updating information, and update the map information based on the received high-standard road segment updating information.

If a destination is set, the apparatus may determine a second area having the destination at the center, transmit the high-standard road segment updating request requesting the high-standard road segment updating information corresponding to the entire area of the map information to the map information delivery center, receives the high-standard road segment updating information, and update the map information based on the received high-standard road segment updating information.

The apparatus may transmit a second area updating request information requesting entire road segment updating information with respect to the entire road segment corresponding to the second area to the map information delivery center, receive, after the high-standard road segment updating information, the second area road segment updating information;

and update the stored map information based on the received second area road segment updating information received from the map information delivery center.

BRIEF DESCRIPTION OF THE DRAWINGS

Exemplary implementations will now be described with reference to the accompanying drawings, wherein.

DETAILED DESCRIPTION OF IMPLEMENTATIONS

A general structure of an exemplary map information delivery system 1 will be described referring to FIG. 1.

Figure 1:
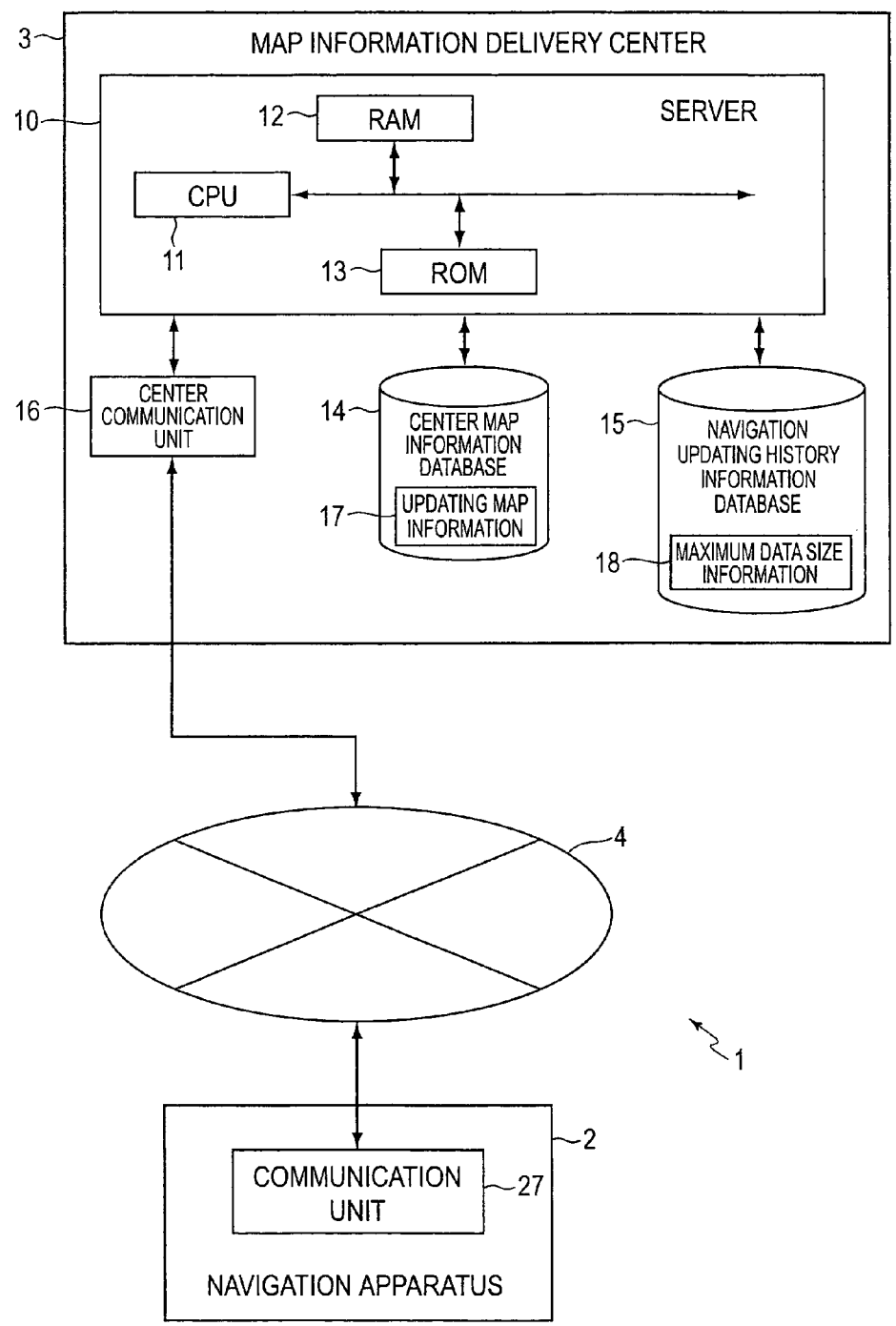
FIG. 1 is a block diagram showing an exemplary map information delivery system.

Referring to FIG. 1, the map information delivery system 1 may include a navigation apparatus 2, a map information delivery center 3, which delivers updating information for updating map information to the navigation apparatus 2, and a network 4. The navigation apparatus 2 and the map information delivery center 3 may transmit and receive various kinds of information via the network 4. The structure of the navigation apparatus 2 will be described in detail later referring to FIG. 2.

Referring to FIG. 1, the map information delivery center 3 may physically, functionally, and or conceptually include a controller (e.g., server 10) and one or more memories (such as, for example, a center map information DB 14 and/or a navigation updating historical information DB 15), and a center communication unit 16. The server 10 may include the inner storage unit, for example, a CPU 11 as an arithmetic device that executes the control function of the server 10, a RAM 12 used as the working memory that may allow the CPU 11 to perform various arithmetic operations, and a ROM 13 that may store various kinds of control programs, for example, for extracting updating information to updating the map information of a predetermined segment area into a new version of the map information in the navigation apparatus 2. An MPU and the like may be used in place of the CPU 11.

The center map information DB 14 may contain updating map information 17 produced in the map information delivery center 3 as the map information that may be used to update the map information stored in the navigation apparatus 2. The map information 17 may be segmented by each version, and the updating information for updating at least a portion of the map information stored in the current navigation apparatus 2 (e.g., current position of the host vehicle or the preliminarily registered area of 30 km×30 km having the home position at the center). The version represents the information for specifying the time at which the map information has been produced. The time at which the map information has been produced may be specified in reference to the version.

The updating map information 17 stored in the center map information DB 14 may contain various kinds of information required for the navigation apparatus 2 to perform route guidance and map display including, for example, map display data for displaying maps, intersection data, node data, link data, facility data, search data for searching the route, shop data with respect to POI (Point of Interest) such as the shop as one kind of facility, and/or retrieval data for retrieving points.

The map display data may be partitioned into secondary meshes measuring 10 km×10 km, and each mesh may be further divided into units that are one-fourth (side length=½), one-sixteenth (side length=¼), and one-sixty-fourth (side length=⅛) the size of the basic mesh. The units may be established for individual areas such that the data volume for each unit is roughly the same. The smallest unit may be the one-sixty-fourth size, which measures approximately 1.25 kilometers on a side.

The node data may contain such data as a branching point of an actual road (including an intersection and a T-shaped intersection), node point coordinates (position) set at predetermined intervals in accordance with the curvature radius of each road, attributes associated with node representing whether the node corresponds to the intersection or the like, a connection link number list as a link number list of the link to be connected to the node, an adjacent node number list as a list of the number of adjacent nodes via the link, and/or the height of the respective nodes (altitude).

The link data may include data on each road link that makes up a road. For each road in a link, the data may indicate the road width, slope, cant, bank, road surface conditions, number of lanes, places where the number of lanes decreases, places where the road width decreases, and/or railroad crossings. For a corner, the data may indicate the radius of curvature, intersection, T-intersecting roads, and/or entrance to and exit from the corner. For road attributes, the data may indicate a downhill road, and/or an uphill road. For a road type, the data may indicate an ordinary road, such as a national road, a prefectural road, a narrow street, or the like, or a toll road, such as a national expressway, an urban expressway, an ordinary toll road, and/or a toll bridge. For toll roads, the data may also include information on access roads (ramps) at expressway entrances and exits, toll collection points (interchanges), and the like.

The updating information for respective types of roads may be classified into a high-standard road segment including the national expressway, the urban expressway, the motor highway, the ordinary toll road, and the national road with route number of one or two digits, a general road segment including the national road with route number of three or more digits, the principal prefectural road, the prefectural road, the municipal road, and a narrow street segment including the narrow street, for each segment unit of about 1.25 km×1.25 km formed by dividing the secondary mesh of 10 km×10 km into 16 divisions (¼). The classified updating information may be stored in the updating map information 17 at each version and managed.

Hereinafter, the national expressway, the urban expressway, the motor highway, the ordinary toll road, and the national road with route number of one or two digits may be referred to as the high-standard road. The national road with route number of three or more digits, the principal prefectural road, the prefectural road, the municipal road may be referred to as the general road. The street in the city area or the like, which is narrower than the general road, may be referred to as the narrow street.

The data used for searching and displaying the set route to the destination may be recorded as the search data, which include the cost data formed of the cost for the passage of the node (hereinafter referred to as the node cost), and the cost for the link which forms the road (hereinafter referred to as the link cost) so as to calculate the search cost, and the route display data for displaying the route selected through the route searching on the map of the liquid crystal display 25.

The data with respect to the POI such as hotels, hospitals, gas stations, parking stations, tourist facilities or the like in the respective areas may be recorded as the shop data together with the ID which specifies the POI. The center map information DB 14 may store voice output data for outputting the predetermined information through a speaker 26 of the navigation apparatus 2.

The map information delivery center 3 may update the map information stored in the navigation apparatus 2 based on the updating map information 17 with the latest version among those stored in the center map information DB 14 based on a request from the navigation apparatus 2. Specifically, in the map information delivery system 1, if the delivery request of the updating map information 17 of the predetermined segment area is sent from the navigation apparatus 2, the updating information for update to the latest version of the updating map information 17 is delivered to the navigation apparatus 2. In this case, all the information including the newly built road information for specifying the newly built road contained in the updating map information 17 with the latest information may be transmitted as the updating information. The information as being minimum for update to the latest version of the updating map information 17 selected from the map information stored in the current navigation apparatus 2 may be transmitted (only the information of the updated portion including the newly built road information) for specifying the newly built road.

Meanwhile, the navigation updating historical information DB 15 may store the information of the updating history with respect to the updating of the map information stored in the navigation apparatus 2 together with the navigation identification ID for specifying the navigation apparatus 2. The navigation updating historical information DB 15 stores, as the updating history, information as to which version of the map information has been used for the predetermined segment area (for example, the area of 30 km×30 km having the home position at the center) at the respective link data which form the map information, and the node data. The update history may be overwritten at each updating of the map information of the navigation apparatus 2. Maximum data size information 18 stored in the navigation update history information DB 15 contains the maximum data size of the updating information which allows the navigation apparatus 2 to update the map information within the predetermined time period together with the navigation identification ID for specifying the navigation apparatus 2.

The map information delivery center 3 may be operated by any one of an individual, company, group, local government, and government-affiliated agency. Alternatively, it may be operated by Vehicle Information and Communication System (VICS®) center.

Communications systems that may be used as the network 4 include, for example, a local area network (LAN), a wide area network (WAN), an intranet, a mobile telephone network, a land-line telephone network, a public communications network, a dedicated communications network, the Internet, and the like. A communications system can also be used that uses communications satellite broadcasting or broadcast satellite broadcasting by a broadcast satellite, digital terrestrial television broadcasting, FM multiplex broadcasting, or the like. A communications system such as a non-stop electronic toll collection (ETC) system, a dedicated short-range communication (DRSC) system, or the like that is used in Intelligent Transportation Systems (ITS) can also be used.

The structure of an exemplary navigation apparatus 2 which may be included in the map information delivery system 1 will be described referring to FIG. 2.

Figure 2:
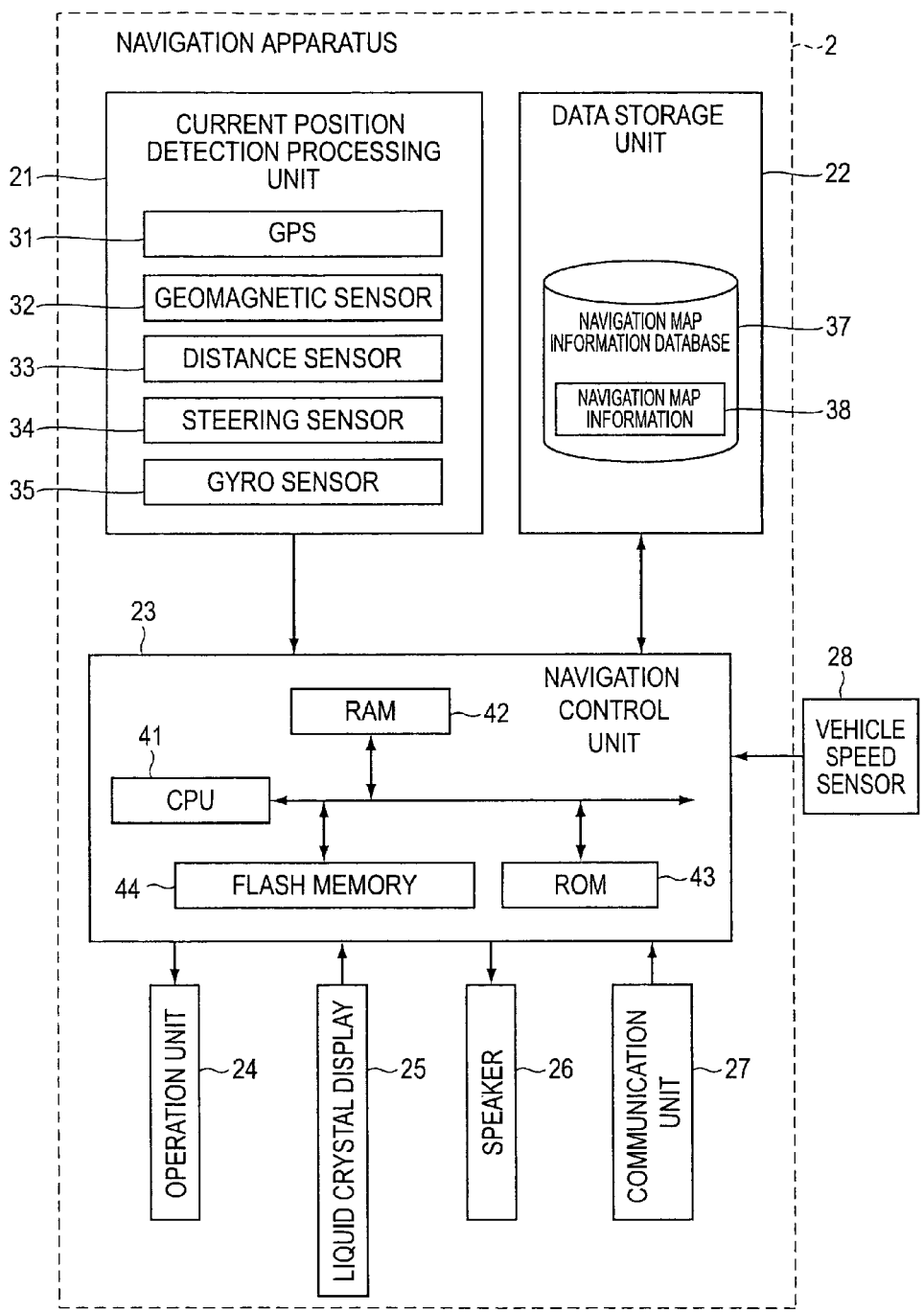
FIG. 2 is a block diagram showing an exemplary navigation apparatus of the map information delivery system.

Referring to FIG. 2, the navigation apparatus 2 may physically, functionally, and/or conceptually include a current position detection processing unit 21 for detecting the current position of the host vehicle, a data storage unit 22 for storing the coordinate position of the preliminarily registered home position (e.g., latitude and longitude) and various kinds of data, a controller (e.g., navigation control unit 23) for executing various arithmetic operations, an operation unit 24 for receiving operations performed by an operator, a liquid crystal display 25 for displaying information such as maps for the operator, a speaker 26 for outputting voice guidance with respect to the route guide, and/or a communication unit 27 for performing communications with information centers such as a traffic information center and the map information delivery center 3. The navigation control unit 23 may be connected to a vehicle speed sensor 28 for detecting the traveling speed of the host vehicle.

Respective components of the navigation apparatus 2 will be described hereinafter. The current position detection processing unit 21 may include a GPS 31, a geomagnetic sensor 32, a distance sensor 33, a steering sensor 34, a gyro sensor 35 as the orientation detector, and an altimeter (not shown) so as to allow detection of the current position, orientation of the host vehicle, the distance from the target, or the like.

More specifically, the GPS 31 may receive radio waves generated by an artificial satellite to detect the current position of the host vehicle and the time on earth. The geomagnetic sensor 32 may measure the earth's magnetism to detect the orientation of the host vehicle. The distance sensor 33 may detect the distance between predetermined positions on the road. A sensor that measures the rotating speed of the wheels (not shown) of the host vehicle to detect the distance based on the measured rotating speed or a sensor that measures the acceleration to detect the distance by integrating the measured acceleration twice may be employed as the distance sensor 33.

The steering sensor 34 may detect the steering angle of the host vehicle. An optical rotation sensor attached to the rotating portion of the steering wheel (not shown), a rotating resistance sensor, an angular sensor attached to the vehicle wheel, or the like may be employed as the steering sensor 34.

The gyro sensor 35 may detect the angle of traverse of the host vehicle. A gasrate gyro, a vibrating gyro or the like may be employed as the gyro sensor 35. The angle of traverse detected by the gyro sensor 35 may be integrated to detect the orientation of the host vehicle.

The data storage unit 22 (memory) may include a hard disk (not shown) as an external memory unit and a recording medium, a navigation map information DB 37 stored in the hard disk, and a recording head (not shown) as a driver for loading the predetermined program and writing the predetermined data into the hard disk. The hard disk may be used as the external memory unit and the recording medium of the data storage unit 22. However, besides the hard disk, a magnetic disk such as a flexible disk or the like may be used as the external memory unit. A memory card, a magnetic tape, a magnetic drum, a CD, an MD, a DVD, an optical disk, an MO, an IC card, an optical card or the like may also be used as the external memory unit.

The navigation map information DB 37 may store navigation map information 38 used for navigation and route searching performed by the navigation apparatus 2, and updated through the map information delivery center 3. Like the updating map information 17, the navigation map information 38 may include various information data required for the route guide and the map display, for example, the newly built road information for specifying respective newly built roads, the map display data for displaying maps, the intersection data with respect to the respective intersection, the node data, the link data, the search data, the shop data, and/or the retrieval data. Note that the explanations with respect to the aforementioned data, which have been already made, will be omitted.

The contents of the navigation map information DB 37 may be updated by downloading the updating information delivered from the map information delivery center 3 via the communication unit 27.

Referring to FIG. 2, the navigation control unit 23 which forms the navigation apparatus 2 may include the inner memory structure including a CPU 41 which may serve as an arithmetic unit and execute the control of the navigation apparatus 2. The navigation control unit 23 may include a RAM 42, which may be used as a working memory allowing the CPU 41 to execute the various arithmetic operations and store the route data resulting from the route search. The navigation control unit 23 may include a ROM 43 that may store the map information updating program (e.g., implementing the method of FIGS. 3-6) to be executed upon start-up of the engine or setting of the destination to be described later in addition to the program for control. The navigation control unit 23 may include a flash memory 44 that may store a program loaded from the ROM 43, and the like. A semiconductor memory, a magnetic core and the like may be employed as the RAM 42, the ROM 43, and the flash memory 44. An MPU may be used as the arithmetic unit and the control unit in place of the CPU 41.

Various programs may be stored in the ROM 43 and various types of data may be stored in the data storage unit 22. The programs and the data may be loaded from the same external storage unit, the same memory card, and the like, so as to be written into the flash memory 44. The programs and the data may be updated by replacing the memory card.

The navigation control unit 23 may be electrically coupled with peripheral units (actuators) of the operation unit 24, the liquid crystal display 25, the speaker 26, and the communication unit 27, respectively.

The operation unit 24 may include various types of keys and a plurality of operation switches (not shown) such as a destination set button, which are operated for correcting the current position when the vehicle starts running, for inputting the starting point as the guide start point and the destination as the guide end point, and/or for retrieving the information with respect to the facilities. Based on the switch signal output through pressing of the respective switches, the navigation control unit 23 may execute the corresponding control of the operations. A keyboard, a mouse, a bar code reader, a remote controller for remote operation, a joystick, a light pen, and a stylus pen may be used as the operation unit 24. The operation unit 24 may be formed as a touch panel attached to the front surface of the liquid crystal display 25.

The liquid crystal display 25 may display the operation guide, operation menu, key guide, route guide from the current position to the destination, the guide information along the route guide, traffic information, news, weather forecast, time, e-mail, TV program, and the like. A CRT display and a plasma display may be employed in place of the liquid crystal display 25. Alternatively, a hologram unit for projecting a hologram onto the windshield of the vehicle may also be employed.

The speaker 26 may output the name of the facility as the selected destination and voice guidance for the traveling along the route guide based on the command from the navigation control unit 23. For example, such messages as "a newly built road to XX ski resort has been updated," "please turn right at the XX intersection 200 m ahead," and "there is a traffic jam on the national road with route no. XX ahead" may be output as the voice guidance. A synthesized voice and/or various types of sound effects may be used as the voice output from the speaker 26, and various types of guide information preliminarily recorded on the tape or memory may also be output.

The communication unit 27 may be a device for communicating with the map information delivery center 3. The communication unit 27 may transmit/receive the latest version of updating map information on a predetermined segment area. Besides the map information delivery center 3, the traffic information including the traffic jam information, traffic regulation information, parking lot information, traffic accident information, crowded state of the service area transmitted from the VICS® center may also be received.

FIGS. 3-7 show an exemplary map information updating method. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

Figure 3:
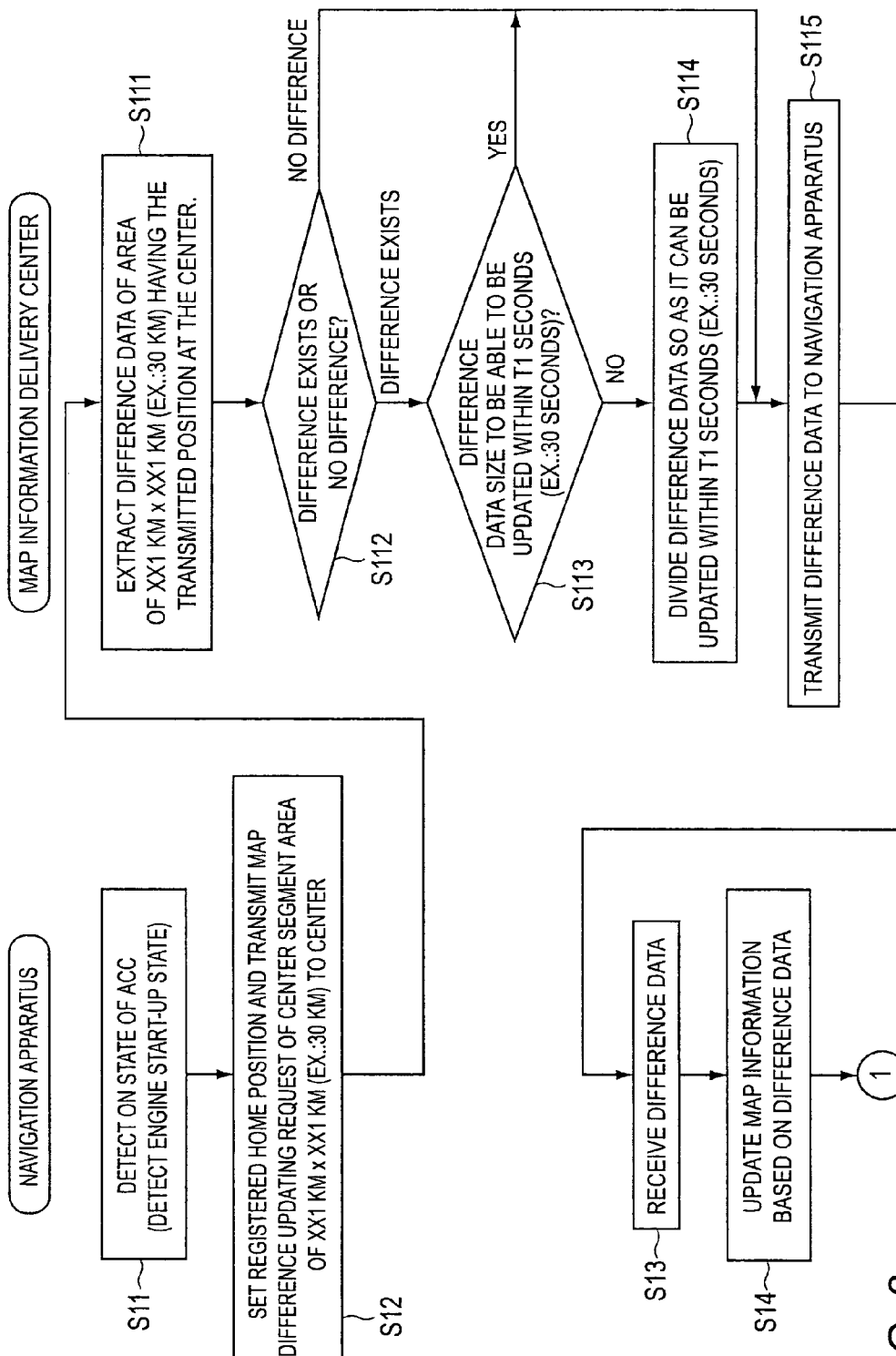
FIGS. 3-6 are flowcharts that show an exemplary map information updating method.
Figure 4:
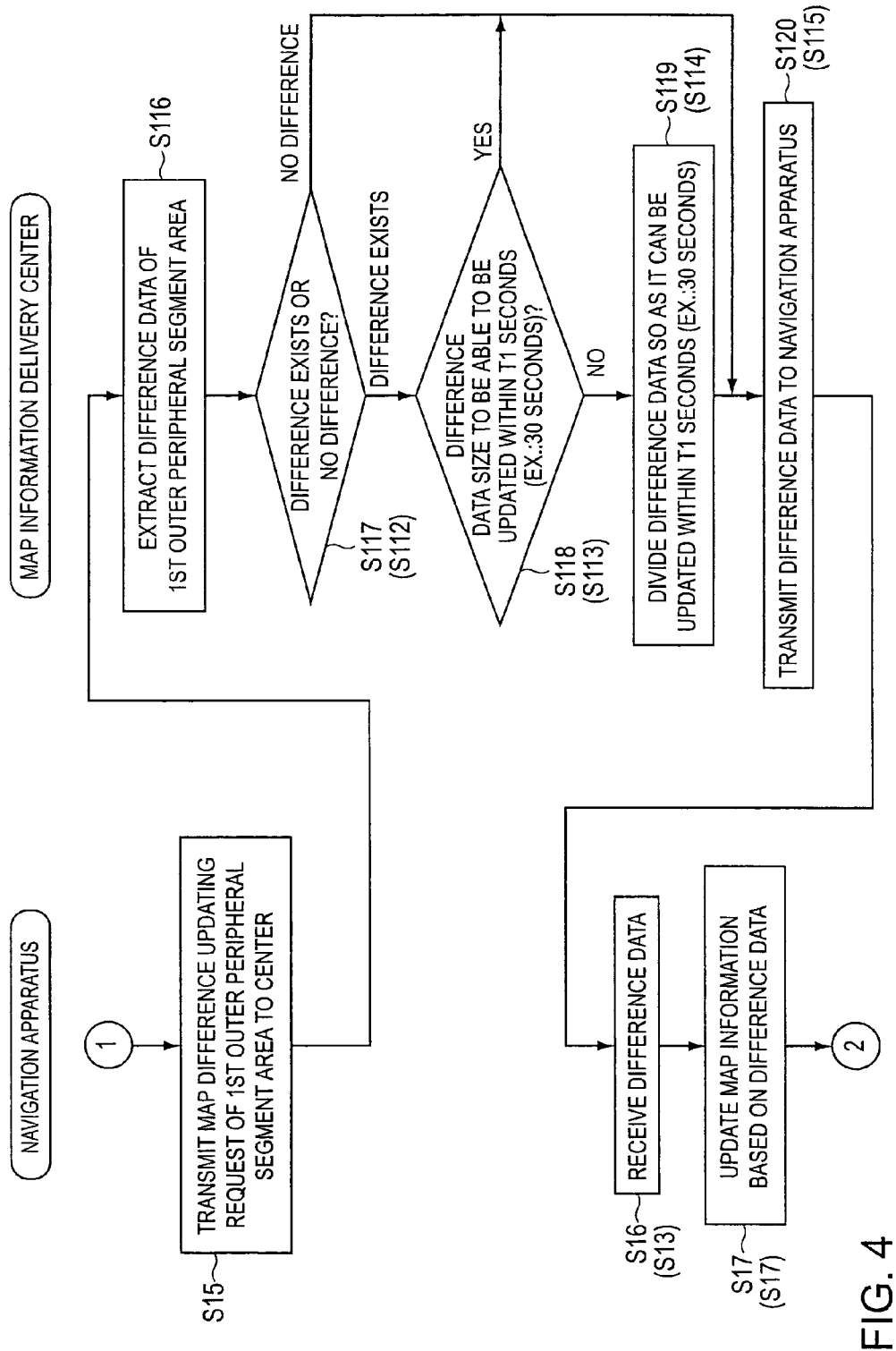
Figure 5:
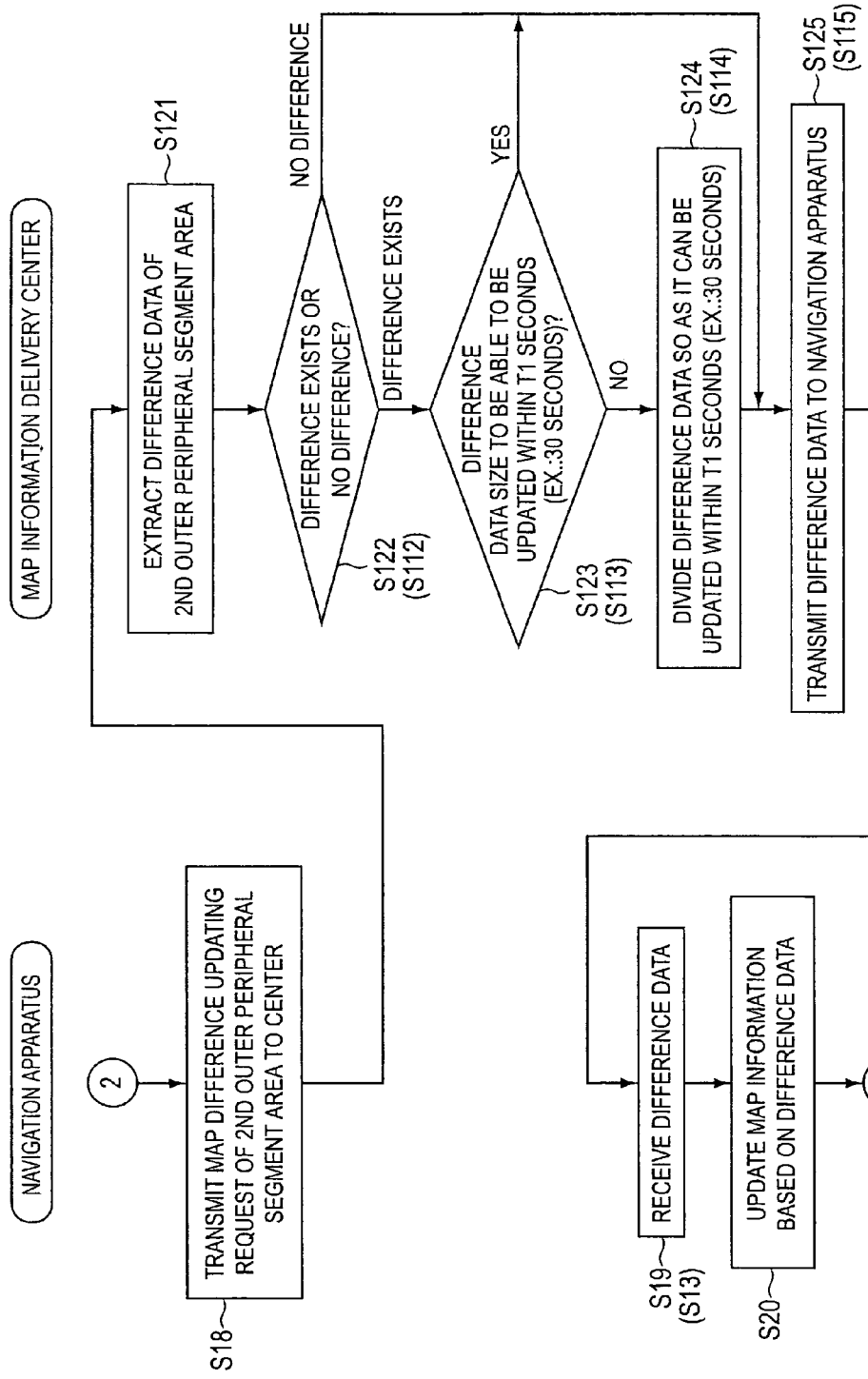
Figure 6:
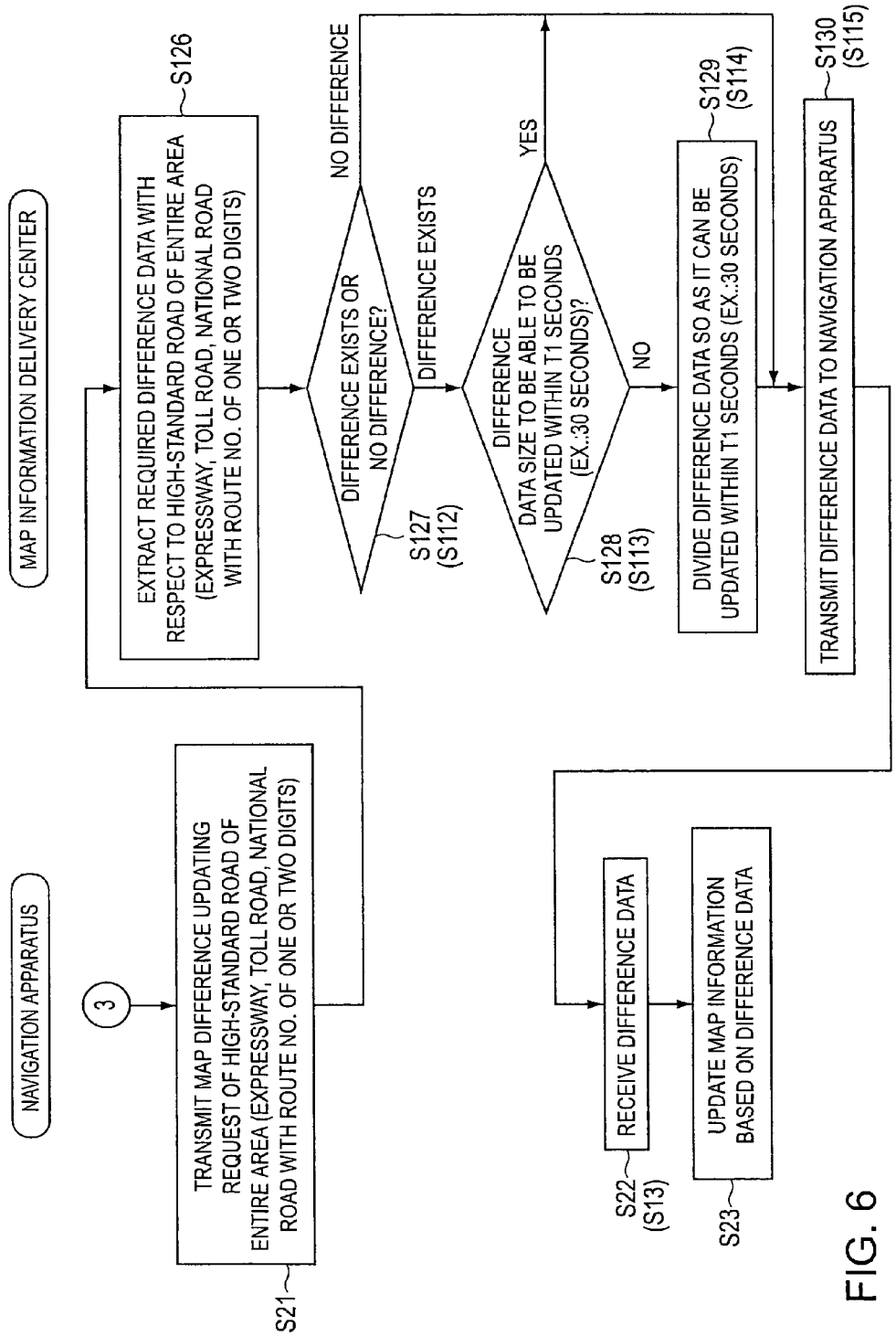

For example, FIG. 3 is a flowchart of a start-up map information updating process for automatically updating the navigation map information 38 of the navigation map information DB 37 to be executed upon activation of the navigation apparatus 2, that is, upon start-up of the engine of the host vehicle. The flowchart represents the updating process of the map information including the entire road segment of the center segment area, which contains the current position. FIG. 4 is a flowchart continued from the one shown in FIG. 3, representing the updating process of the map information which may include the entire road segment of the first outer peripheral segment area outside the center segment area. FIG. 5 is a flowchart continued from the one shown in FIG. 4, representing the updating process of the map information which may include the entire road segment of the second outer peripheral segment area outside the first outer peripheral segment area. FIG. 6 is a flowchart continued from the one shown in FIG. 5, representing the updating process of the map information with respect to the high-standard road segment of the entire area. The respective programs of the flowcharts shown in FIGS. 3 to 6 are stored in the ROM 43 of the navigation apparatus 2, and the ROM 13 of the map information delivery center 3 so as to be executed by the CPUs 41 and 11, respectively.

Referring to FIG. 3, the CPU 41 of the navigation apparatus 2 detects whether an accessory switch (ACC) has been turned ON, or the engine of the vehicle has been started up in response to turning of the ignition switch ON in step (hereinafter abbreviated to S) 11. That is, it is detected whether the navigation apparatus 2 has been activated. When the accessory switch (ACC) has been turned ON or the ignition switch has been turned ON to start up the engine of the vehicle. That is, the navigation apparatus 2 has been activated and the destination is not set yet. Therefore, the CPU 41 proceeds to execute S12.

In S12, the CPU 41 of the navigation apparatus 2 loads home position information preliminarily registered in the data storage unit 22 (e.g., latitude and longitude of the home position, hereinafter referred to as "registered home position") so as to be stored in the RAM 42. The CPU 41 sets the square area of XX3 km×XX3 km having the registered home position at the center (e.g., the square area of about 100 km×100 km) as the predetermined area (first area) to be subjected to the map information updating so as to be stored in the RAM 42. The CPU 41 divides the predetermined area into the center segment area of XX1 km×XX1 km (e.g., about 30 km×30 km) having the registered home position at the center, the first outer peripheral segment area and the second outer peripheral segment area each of which surrounds the outer periphery of the center segment area at the predetermined interval (e.g., from about 30 km to 40 km) so as to be stored in the RAM 42. The CPU 41 allocates priorities to the aforementioned areas such that the priority order is lowered as the area shifts outward from the center segment area, the first and the second outer peripheral segment areas so as to be stored in the RAM 42.

The CPU 41 loads the registered home position data and the range information of the center segment area with the first priority from the RAM 42. Based on the loaded data, the map difference updating request information (segment area updating request information) which requires the difference data for updating the map information of the center segment area of XX1 km×XX1 km having the registered home position at the center is transmitted to the map information delivery center 3 via the communication unit 27.

Figure 7A:
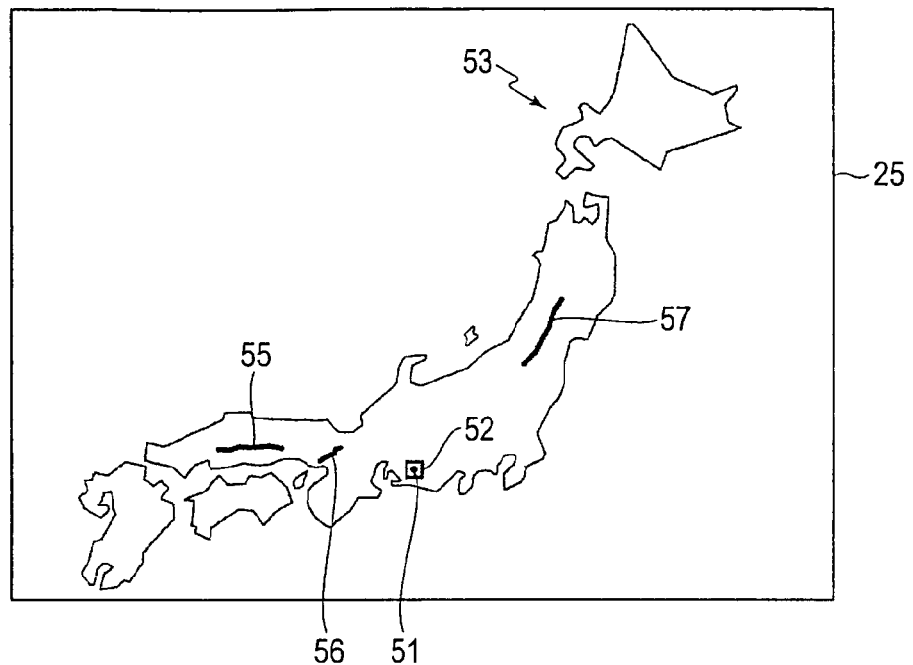
FIG. 7A is a diagram graphically showing the updating content of the map information.

For example, referring to FIG. 7A, when the ignition switch is turned ON at the home position, the destination has not been set. The CPU 41 loads the registered home position 51 from the data storage unit 22 so as to be stored in the RAM 42. The CPU 41 sets the square area of 100 km×100 km which contains the registered home position 51 as a predetermined area 52 (first area) subjected to the map information updating so as to be stored in the RAM 42.

Figure 7B:
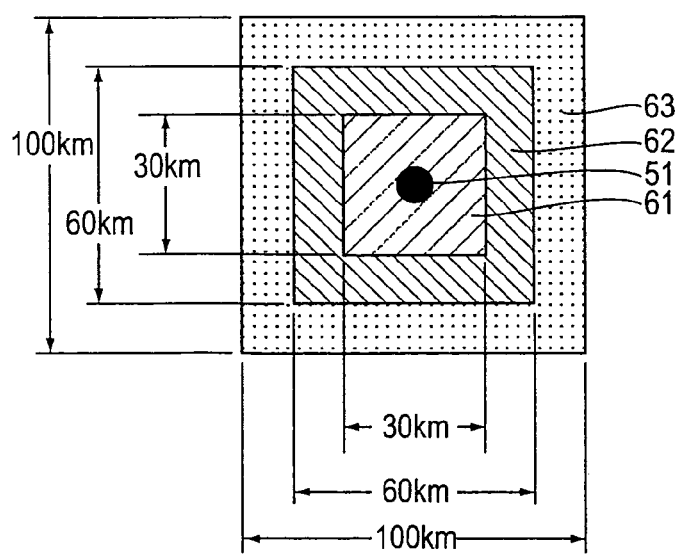
FIG. 7B is a diagram graphically showing the center segmented map information.

Referring to FIG. 7B, the CPU 41 sets the square area with about 30 km×30 km having the registered home position at the approximate center in the predetermined area 52 as the center segment area 61 with the first priority so as to be stored in the RAM 42. The CPU 41 sets the segment area which surrounds outside of the center segment area 61 at the interval of about 30 km as the first outer peripheral segment area 62 with the second priority so as to be stored in the RAM 42. The CPU 41 further sets the segment area which surrounds the outside of the first outer peripheral segment area 62 at the interval of about 40 km as the second outer peripheral segment area 63 with the third priority so as to be stored in the RAM 42.

Then the CPU 41 loads the position data of the registered home position 51 and the range information of the center segment area 61 from the RAM 42. The map difference updating request information (segment area updating request information) which requires the difference data for updating the area of about 30 km×30 km having the registered home position 51 at the approximate center, that is, for updating the map information of the center segment area 61 is transmitted to the map information delivery center 3 via the communication unit 27.

Meanwhile, as shown in FIG. 3, the CPU 11 of the map information delivery center 3 receives the map difference updating request information (segment area updating request information) which requires the difference data for updating the map information of the center segment area of XX1 km×XX1 km having the registered home position at the approximate center transmitted from the navigation apparatus 2 via the center communication unit 16. Then in S111, the CPU 11 of the map information delivery center 3 loads the map version of the center segment area of XX1 km×XX1 km having the registered home position at the approximate center stored in the map information of the navigation apparatus 2 from the navigation updating historical information DB 15. Then the difference data (entire road segment updating information) between the map information of the present map version and the map information of the latest version of the center segment area stored in the updating map information 17 with respect to the entire road segment including the high-standard road segment, general road segment and narrow street road segment are extracted.

Referring to FIG. 7B, the CPU 11 of the map information delivery center 3 loads the map version of the center segment area 61 with about 30 km×30 km having the registered home position 51 at the approximate center from the navigation updating historical information DB 15 to extract the difference data (entire road segment updating information) which contains the updating information with respect to the entire road segment between the map information of the present map version and the map information of the latest version of the center segment area 61 stored in the updating map information 17.

In S112, the CPU 11 determines whether the difference data between the map information of the map version and the map information of the latest version of the center segment area stored in the updating map information 17 exists. If the different data does not exist (S112: no difference), the process proceeds to S115 where the CPU 11 transmits the information data indicating that no difference data exist to the navigation apparatus 2 via the center communication unit 16.

Meanwhile, if the difference data exist (S112: difference exists), the process proceeds to S113 where the CPU 11 executes determination processing. In this processing, it is determined whether the difference data size is equal to or smaller than the maximum data size which allows the map information received by the navigation apparatus 2 to be updated within a predetermined time of T1 seconds (e.g., from about 20 to about 35 seconds).

If the difference data size is equal to or smaller than the maximum data size which allows the map information received by the navigation apparatus 2 to be updated within the predetermined time of T1 seconds (S113: YES), the process proceeds to S115 where the CPU 11 transmits the difference data to the navigation apparatus 2 via the center communication unit 16.

Meanwhile, if the difference data size exceeds the maximum data size, which allows updating of the map information received by the navigation apparatus 2 within the predetermined time of T1 seconds (S113: NO), the process proceeds to S114. In S114, the CPU 11 divides the difference data by the maximum data size so as to be stored in the RAM 12. For example, in S114, the CPU 11 divides the center segment area into meshes each of 5 km×5 km to 10 km×10 km, and extracts the difference data including the updating information with respect to the entire road segment by each mesh sequentially. The difference data are divided by the data size approximate to the maximum data size into units of the meshes so as to be stored in the RAM 12.

Then in S115, the CPU 11 loads the difference data, which have been divided by the data size, approximate to the maximum data size into the units of the meshes sequentially so as to be sequentially delivered to the navigation apparatus 2 via the center communication unit 16.

For example, in S115, the CPU 11 sequentially loads the difference data divided by the data size approximate to the maximum data size into units of the meshes, and delivers the difference data to the navigation apparatus 2 via the center communication unit 16.

Referring to FIG. 3, the CPU 41 of the navigation apparatus 2 receives the difference data which contains the updating information with respect to the entire road segment transmitted from the CPU 11 of the map information delivery center 3, and stores the difference data in the RAM 42 in S13. If the difference data is received twice or more, the CPU 41 may allocate identification numbers to the respective difference data in the order of reception so as to be stored in the RAM 42.

In S14, the CPU 41 loads the received difference data from the RAM 42 again. If the data indicates that no difference data exists, the process proceeds to S15 (see FIG. 4).

If the difference data is received once, the CPU 41 loads the difference data from the RAM 42 again in S14, and updates the map information with respect to the entire road segment of the center segment area based on the difference data. The process then proceeds to S15 (see FIG. 4). The map of the center segment area is updated into the map of the latest version, based on which the route search and the like in the center segment area may be executed.

In S14, if the difference data is received twice or more, the CPU 41 loads the first received difference data from the RAM 42 again. Based on the difference data, the map information with respect to the entire road segment of the center segment area is updated. Then the next received difference data are loaded, based on which the map information with respect to the entire road segment of the center segment area is updated. The process then proceeds to S15 (see FIG. 4).

Thus, the map information with respect to the entire road segment of the center segment area may be sequentially updated at the predetermined time interval of T1 seconds, and the updated map may be displayed on the liquid crystal display 25. This makes it possible to execute the route search and the like in the center segment area based on the map information, which has been sequentially updated, without waiting for all of the map information to be updated.

Referring to FIG. 7B, for example, if the difference data with respect to the entire road segment formed as the unit of square mesh of 2.5 km×2.5 km to 10 km×10 km are received twice or more, the CPU 41 is allowed to update the map information of the center segment area 61 sequentially into the map information of the latest version in the unit of square mesh with 2.5 km×2.5 km to 10 km×10 km at the predetermined time interval of T1 seconds.

Referring to FIG. 4, the CPU 41 of the navigation apparatus 2 loads the range information of the first outer peripheral segment area allocated with the second priority in S12 from the RAM 42 in S15, based on which the map difference updating request information (segment area updating request information) which requires the difference data for updating the map information of the first outer peripheral segment area is transmitted to the map information delivery center 3 via the communication unit 27.

For example, as shown in FIG. 7B, the CPU 41 loads, from the RAM 42, the range information of the first outer peripheral segment area 62 with the second priority, which surrounds the outer periphery of the center segment area 61 at the interval of about 30 km, based on which the map difference updating request information (segment area updating request information) which requires the difference data for updating the map information of the first outer peripheral area 62 is transmitted to the map information delivery center 3 via the communication unit 27.

Meanwhile, referring to FIG. 4, the CPU 11 of the map information delivery center 3 receives the map difference updating request information (segment area updating request information) which requires the difference data for updating the map information of the first outer peripheral segment area transmitted from the navigation apparatus 2 via the center communication unit 16. Then in S116, the CPU 11 of the map information delivery center 3 loads the map version of the first outer peripheral segment area stored in the map information of the navigation apparatus 2 from the navigation updating historical information DB 15. The CPU 11 extracts the difference data (entire road segment updating information) including the updating information with respect to the entire road segment, that is, the high-standard road segment, the general road segment and the narrow street segment between the map information of the map version and the map information of the latest version of the first outer peripheral segment area stored in the updating map information 17.

Referring to FIG. 7B, the CPU 11 of the map information delivery center 3 loads the map version of the first outer peripheral segment area 62 from the navigation updating historical information DB 15 to extract the difference data (entire road segment updating information) including the updating information with respect to the entire road segment between the map information of the map version and the map information of the latest version of the first outer peripheral segment area 62 stored in the updating map information 17.

In S117 to S120, the CPU 11 executes the same processing as in S112 to S115, except with respect to the first outer peripheral segment area 62.

If the data size of the difference data exceeds the maximum data size which allows the map information received by the navigation apparatus 2 to be updated within the predetermined time of T1 seconds (e.g., from about 20 to 35 about seconds) in S118 (S118: NO), the process proceeds to S119 where the CPU 11 divides the first outer peripheral segment area into meshes each with 2.5 km×2.5 km to 10 km×10 km such that the difference data including the updating information with respect to the entire road segment at each mesh is sequentially extracted. The extracted difference data are divided into the data with the size approximate to the maximum data size in the unit of the mesh so as to be stored in the RAM 12. In S120, the CPU 11 sequentially loads the difference data, which has been divided by the data size approximate to the maximum data size in the unit of mesh, and delivers the difference data to the navigation apparatus 2 via the center communication unit 16.

Referring to FIG. 4, in S16, the CPU 41 of the navigation apparatus 2 executes the same processing as in S13 described above. In S17, the CPU 41 loads the received difference data from the RAM 42 again. If the data indicates that the difference data does not exist, the process proceeds to S18 (see FIG. 5).

In S17, if the difference data is received only once, the CPU 41 loads the difference data from the RAM 42 again. Based on the loaded difference data, the map information with respect to the entire road segment of the first outer peripheral segment area is updated, and the process proceeds to S18 (see FIG. 5). The map of the first outer peripheral segment area becomes the map of the latest version, based on which the route search and the like in the first outer peripheral area is performed.

In S17, if the difference data are received twice or more, the CPU 41 loads the first received difference data from the RAM 42 again, based on which the map information with respect to the entire road segment of the first outer peripheral segment area is updated. Then the next received difference data is sequentially loaded, based on which the map information with respect to the entire road segment of the first outer peripheral segment area is sequentially updated. The process then proceeds to S18 (see FIG. 5).

Thus, the map information with respect to the entire road segment of the first outer peripheral segment area may be sequentially updated in a reliable manner at the predetermined time interval of T1 seconds. This makes it possible to display the updated map on the liquid crystal display 25, and the route search and the like in the first outer peripheral segment area may be performed based on the map information sequentially updated, without waiting for all of the map information to be updated.

Referring to FIG. 7A, for example, if the difference data formed of the units of meshes each of 2.5 km×2.5 km to 10 km×10 km are received twice or more, the CPU 41 is allowed to update the map information with respect to the entire road segment of the first outer peripheral segment area 62 into the map information of the latest version in the unit of mesh with 2.5 km×2.5 km to 10 km×10 km sequentially at the predetermined time interval of T1 seconds.

Referring to FIG. 5, in S18, the CPU 41 of the navigation apparatus 2 loads the range information of the second outer peripheral segment area allocated with the third priority in S12 as described above from the RAM 42, based on which the map difference updating request information (segment area updating request information) which requires the difference data for updating the map information of the second outer peripheral segment area is transmitted to the map information delivery center 3 via the communication unit 27.

Referring to FIG. 7B, for example, the CPU 41 loads the range information of the second outer peripheral segment area 63 with the third priority which surrounds outside of the first outer peripheral segment area 62 at the interval of about 40 km from the RAM 42, based on which the map difference updating request information (segment area updating request information) which requires the difference data for updating the map information of the second outer peripheral segment area 63 is transmitted to the map information delivery center 3 via the communication unit 27.

Referring to FIG. 5, the CPU 11 of the map information delivery center 3 receives the map difference updating request information (segment area updating request information) which requires the difference data for updating the map information of the second outer peripheral segment area transmitted from the navigation apparatus 2 via the center communication unit 16. Then in S121, the CPU 11 of the map information delivery center 3 loads the map version of the second outer peripheral segment area stored in the map information of the navigation apparatus 2 from the navigation updating historical information DB 15. Then the difference data (entire road segment updating information) including the updating information with respect to the entire road segment, that is, high-standard road segment, general road segment and narrow street segment between the map information of the map version and the map information of the latest version of the second outer peripheral segment area stored in the updating map information 17 are extracted.

Referring to FIG. 7B, for example, the CPU 11 of the map information delivery center 3 loads the map version of the second outer peripheral segment area 63 from the navigation updating historical information DB 15 to extract the difference data (entire road segment updating information) including the updating information with respect to the entire road segment between the map information of the map version and the map information of the latest version of the second outer peripheral segment area 63 stored in the updating map information 17.

In S122 to S125, the CPU 11 executes the same processing as in S112 to S115 except with respect to the second outer peripheral segment area 63.

If the data size of the difference data exceeds the maximum data size which allows the map information received by the navigation apparatus 2 to be updated within the predetermined time of T1 seconds (e.g., from about 20 to about 35 seconds) in S123 (S123: NO), the process proceeds to S124 where the CPU 11 divides the second outer peripheral segment area into meshes each with 2.5 km×2.5 km to 10 km×10 km. The difference data including the updating information with respect to the entire road segment is extracted sequentially by each mesh. The difference data is further divided by the size approximate to the maximum data size in the unit of the mesh so as to be stored in the RAM 12. In S125, the CPU 11 sequentially loads the difference data, which has been divided by the size approximate to the maximum data size in the unit of the mesh sequentially, and delivers the difference data to the navigation apparatus 2 via the center communication unit 16 sequentially.

Referring to FIG. 5, in S19, the CPU 41 of the navigation apparatus 2 executes the same processing as in S13. Then in S20, the CPU 41 loads the received difference data from the RAM 42. If the data indicate that no difference data exist, the process proceeds to S21 (see FIG. 6).

In S20, if the difference data are received only once, the CPU 41 loads the difference data from the RAM 42 again, based on which the map information with respect to the entire road segment of the second outer peripheral segment area is updated. The process then proceeds to S21 (see FIG. 6). The map of the second outer peripheral segment area is updated to the map of the latest version, based on which the route search and the like in the second outer peripheral segment area may be performed.

In S20, if the difference data is received twice or more, the CPU 41 loads the first received difference data from the RAM 42 again. Based on the difference data, the map information with respect to the entire road segment of the second outer peripheral segment area is updated. The next received difference data is then sequentially loaded, based on which the map information with respect to the entire road segment of the second outer peripheral segment area are updated. The process proceeds to S21 (see FIG. 6).

Thus, the map information with respect to the entire road segment of the second outer peripheral segment area may be sequentially updated in a reliable manner at the predetermined time interval of T1 seconds to display the updated map on the liquid crystal display 25. Based on the sequentially updated map information, the route search in the second outer peripheral segment area may be performed, without waiting for all of the map information to be updated.

For example, referring to FIG. 7B, if the difference data formed of units of meshes each with about 2.5 km×2.5 km to 10 km×10 km is received twice or more, the CPU 41 updates the map information with respect to the entire road segment of the second outer peripheral segment area 63 into the map information of the latest version sequentially by the unit of the mesh with about 2.5-by-2.5 km to 10-by-10 km at the predetermined time interval of T1 seconds. This makes it possible to perform the route search and the like.

Referring to FIG. 6, the CPU 41 of the navigation apparatus 2 stores the entire area of the map information, that is, the entire area in Japan in the RAM 42 as the predetermined area subjected to the updating of the map information. The CPU 41 transmits the map difference updating request information (high-standard road segment updating request information), which requires the difference data for updating the map information with respect to the high-standard road segment within the entire area to the map information delivery center 3 via the communication unit 27.

Referring to FIG. 6, the CPU 11 of the map information delivery center 3 receives the map difference updating request information (high-standard road segment updating request information), which requires the difference data for updating the map information with respect to the high-standard road segment of the entire area transmitted from the navigation apparatus 2 via the center communication unit 16. Then in S126, the CPU 11 of the map information delivery center 3 loads the map version of the entire area stored in the map information of the navigation apparatus 2 from the navigation updating historical information DB 15. The difference data with respect to the high-standard road segment between the map information of the map version and the map information of the latest version of the entire area stored in the updating map information 17 is extracted.

Referring to FIG. 7A, for example, the CPU 11 of the map information delivery center 3 loads the map version of the entire area 53 from the navigation updating historical information DB 15 to extract the difference data with respect to the high-standard roads 55, 56, 57 between the map information of the map version and the map information of the latest version of the entire area 53 stored in the updating map information 17.

In S127, the CPU 11 determines whether the difference data with respect to the high-standard road segment of the entire area between the map information of the map version and the map information with respect to the updating map information 17 exist. If no difference data exist (S127: no difference), the process proceeds to S130 where the CPU 11 transmits the information data indicating that no difference data with respect to the high-standard road segment exist to the navigation apparatus 2.

Meanwhile, if the difference data with respect to the high-standard road exist (S127: difference exists), the CPU 11 executes the same processing as in S113 to S115, in S128 to S130.

If the data size of the difference data exceeds the maximum data size which allows the map information received by the navigation apparatus 2 to be updated within the predetermined time of T1 seconds (e.g., from about 20 to 35 seconds) in S128 (S128: NO), the process proceeds to S129 where CPU 11 divides the entire area into meshes each with 2.5 km×2.5 km to 10 km×10 km. Then, only the difference data of the meshes with respect to the high-standard road to be updated are sequentially extracted by the mesh. The difference data are divided into the data with the size approximate to the maximum data size by each mesh so as to be stored in the RAM 12. In 130, the CPU 11 sequentially loads the difference data divided by the data size approximate to the maximum data in the unit of mesh, and delivers the difference data to the navigation apparatus 2 via the center communication unit 16.

Referring to FIG. 6, in S22, the CPU 41 of the navigation apparatus 2 executes the same processing as in S13. In S23, the CPU 41 loads the received difference data from the RAM 42 again. If the data indicate that no difference data exist, the process ends.

Also in S23, if the difference data is received only once, the difference data is loaded from the RAM 42 again, based on which the map information with respect to the high-standard road segment of the entire area is updated, and the process ends. As a result, the map with respect to the high-standard road segment in the entire area (e.g., in Japan) becomes the map of the latest version, based on which the route search and the like within the entire area may be performed.

In S23, if the difference data is received twice or more, the first received difference data is loaded from the RAM 42 again, based on which the map information with respect to the high-standard road segment of the entire area is updated. Then the next received difference data is sequentially loaded, based on which the map information with respect to the high-standard road segment of the entire area is sequentially updated. The process then ends.

Thus, the map information of the entire area (e.g., Japan) may be sequentially updated in a reliable manner at the predetermined time interval of T1 seconds (e.g., at the interval about 20 to 35 seconds) to allow the map having the high-standard road updated to be displayed on the liquid crystal display 25. Based on the sequentially updated map information, the route search and the like in the entire area may be performed, without waiting for all of the data to be updated.

Referring to FIG. 7A, for example, if the difference data formed of units of meshes each with 2.5 km×2.5 km to 10 km×10 km are received twice or more, the CPU 41 sequentially updates the map information of the entire area 53 to the map information of the latest version with respect to the high-standard road segment by the unit of the mesh of 2.5 km×2.5 km to 10 km×10 km at the predetermined time interval of T1 seconds. The updated high-standard roads 55, 56, 57 may be displayed on the liquid crystal display 25 so as to be distinguished from the other roads. Based on the updated high-standard roads 55, 56, 57, the route search within the entire area may be performed.

Figure 8:
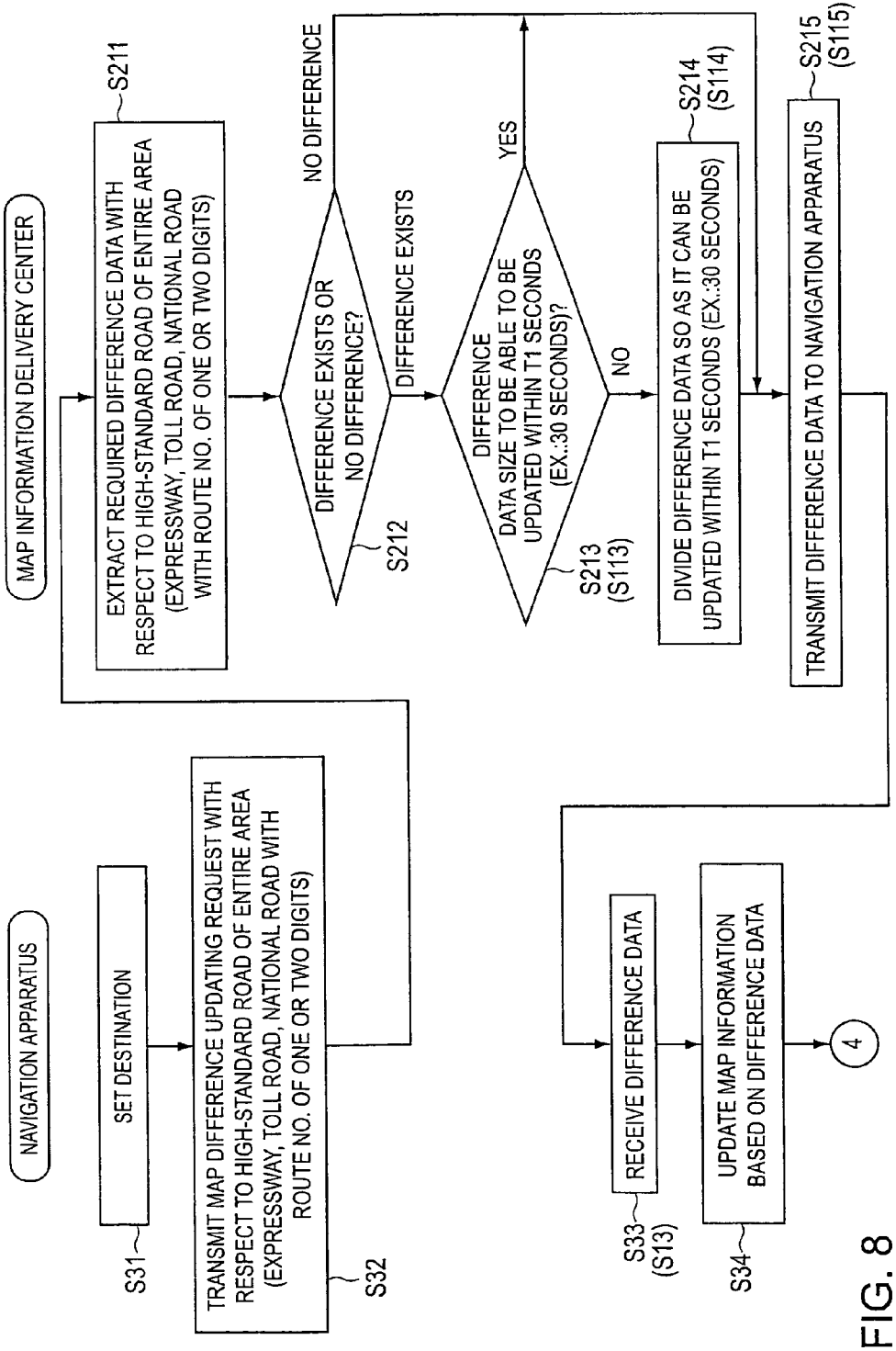
FIGS. 8 and 9 are flowcharts that show an exemplary map information updating method.
Figure 9:
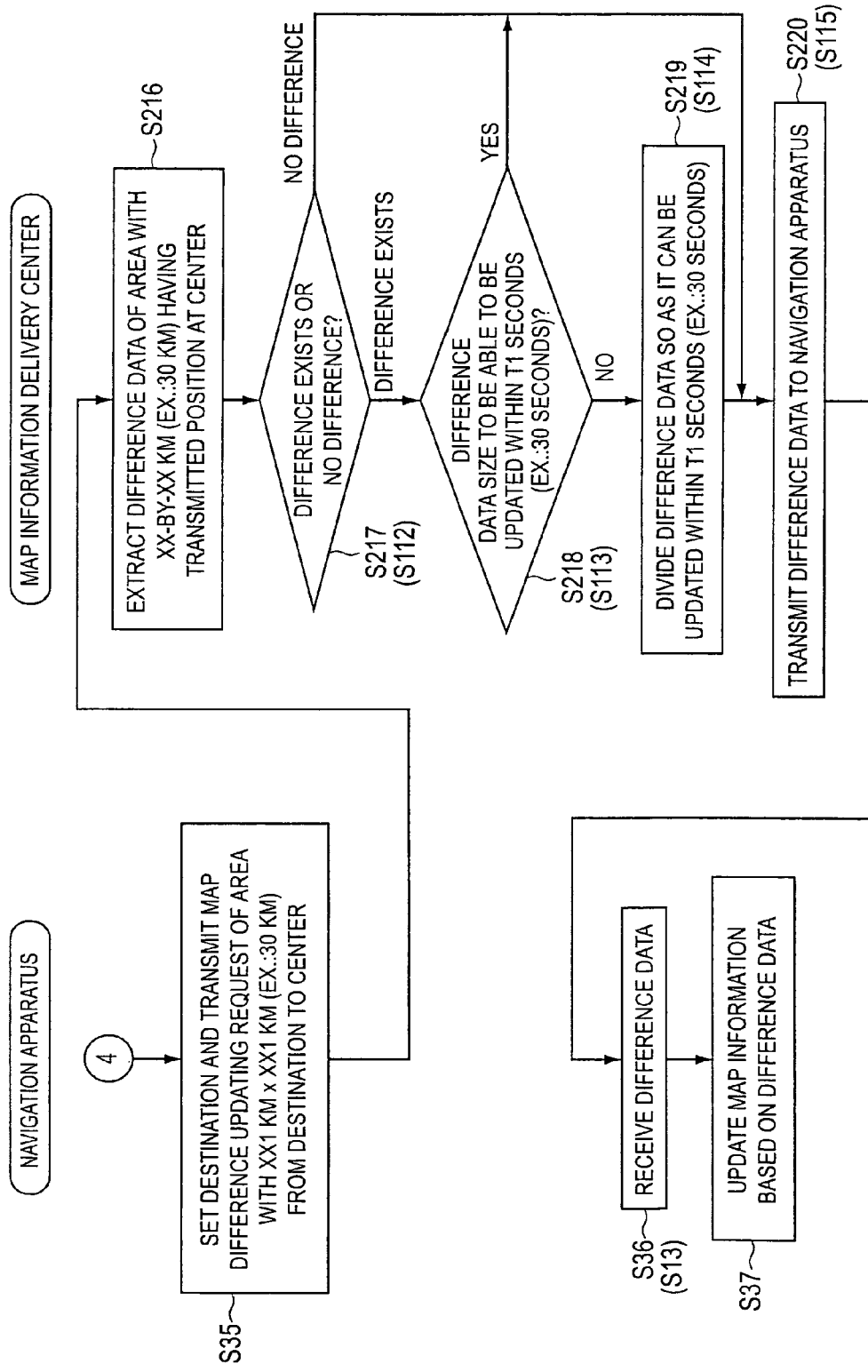

FIGS. 8 and 9 show an exemplary map information updating method. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

This exemplary method related, for example, to automatically updating the navigation map information 38 of the navigation map information DB 37 executed by the CPU 41 of the navigation apparatus 2 and the CPU 11 of the map information delivery center 3 when the destination is set far from the current position by a predetermined distance or farther (e.g., 100 km or farther) by the navigation apparatus 2.

FIG. 8 is a flowchart showing the destination setting map information updating process for automatically updating the navigation map information 38 of the navigation map information DB 37 executed when the destination far from the current position by a predetermined distance (e.g., 100 km or farther) is set by the navigation apparatus 2 in the map information delivery system 1 according to the embodiment. More specifically, the flowchart represents the updating process of the map information with respect to the high-standard road segment. FIG. 9 is the flowchart continued from the one shown in FIG. 8, showing the process for updating the map information which may include the entire road segment of the predetermined area which contains the destination (e.g., an area of about 10 km×10 km to 30 km×30 km). The respective programs shown in the flowcharts of FIGS. 8 and 9 are stored in the ROM 43 of the navigation apparatus 2 and the ROM 13 of the map information delivery center 3, and executed by the CPUs 41 and 11, respectively.

Referring to FIG. 8, when the destination is designated through the operation unit 24 in S31, the CPU 41 of the navigation apparatus 2 stores the destination in the RAM 42. The CPU 41 detects the current position of the host vehicle (hereinafter referred to as the "host vehicle position") based on the detection result of the current position detection processing unit 21 so as to be stored in the RAM 24. The CPU 41 loads the host vehicle position and the destination from the RAM 42 again. If the destination is at a point far apart from the current position, that is, a point far from the host vehicle position by a predetermined distance or farther (e.g., 100 km or farther), the process proceeds to S32.

For example, in the case in which the destination is set at the home position, if the destination is outside the second outer peripheral segment area set in S12, the process proceeds to S32.

In S32, the CPU 41 of the navigation apparatus 2 sets the entire area of the map information, that is, the entire area of Japan, as the predetermined area having the map information updated so as to be stored in the RAM 42. The CPU 41 transmits the map difference updating request information (high-standard road segment updating request information), which requires the difference data for updating the map information with respect to the high-standard road segment of the entire area to the map information delivery center 3 via the communication unit 27.

Figure 10A:
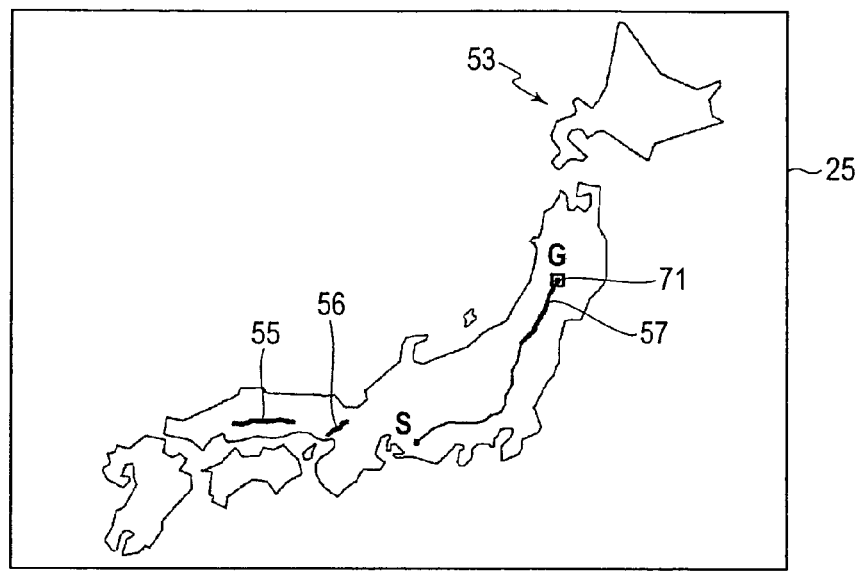
FIG. 10A is a diagram graphically showing the updating content of the map information.

For example, referring to FIG. 10A, if the destination G far from the host vehicle position S by 100 km or farther is set, the CPU 41 transmits the map difference updating request information (high-standard road segment updating request information) which requires the difference data for updating the map information with respect to the high-standard road segment in the entire area to the map information delivery center 3 via the communication unit 27.

Meanwhile, referring to FIG. 8, the CPU 11 of the map information delivery center 3 receives the map difference updating request information (high-standard road segment updating request information) which requires the difference data for updating the map information with respect to the high-standard road segment in the entire area transmitted from the navigation apparatus 2. Then in S211, the CPU 11 of the map information delivery center 3 loads the map version of the entire area stored in the map information of the navigation apparatus 2 from the navigation updating historical information DB 15. The difference data with respect to the high-standard road segment between the map information of the map version and the map information of the latest version of the entire area stored in the updating map information 17 is extracted.

For example, referring to FIG. 10A, the CPU 11 of the map information delivery center 3 loads the map version of the entire area 53 from the navigation updating historical information DB 15 to extract the difference data with respect to the high-standard roads 55, 56, 57 between the map information of the map version and the map information of the latest version of the entire area 53 stored in the updating map information 17.

In S212, the CPU 11 determines whether the difference data between the map information of the map version and the map information with respect to the high-standard road segment in the entire area stored in the updating map information 17 exist. If the difference data does not exist (S212: no difference), the process proceeds to S215 where the CPU 11 transmits the information data indicating that no difference data exists with respect to the high-standard road to the navigation apparatus 2.

Meanwhile, if the difference data with respect to the high-standard road exists (S212: difference exists), the CPU 11 executes the same processing as in S113 to S115, in S213 to S215.

In S213, if the data size of the difference data exceeds the maximum data size which allows the map information received by the navigation apparatus 2 to be updated within the predetermined time of T1 seconds (e.g., from about 20 to 35 seconds) (S213: NO), the process proceeds to S214 where the CPU 11 divides the entire area into the meshes each of 2.5 km×2.5 km to 10 km×10 km. The difference data is extracted by the mesh with respect to the high-standard road to be updated. The difference data is divided by the data with the size approximate to the maximum data size in the unit of the mesh so as to be stored in the RAM 12. In S215, the CPU 11 sequentially loads the difference data, which has been divided by the data size approximate to the maximum data size by the unit of mesh, and delivers the difference data to the navigation apparatus 2 via the center communication unit 16.

Referring to FIG. 8, in S33, the CPU 41 of the navigation apparatus 2 executes the same processing as in S13 described above. In S34, the CPU 41 loads the received difference data from the RAM 42. If the data indicates that the difference data does not exist, the process proceeds to S35 (see FIG. 9).

In S34, if the difference data is received only once, the difference data is loaded from the RAM 42 again, based on which the map information with respect to the high-standard road segment of the entire area is updated, and the process proceeds to S35 (see FIG. 9). As a result, the map with respect to the high-standard road segment of the entire area (e.g., Japan) becomes the map of the latest version, based on which the route search and the like in the entire area may be performed.

In S34, if the difference data is received twice or more, the first received difference data is loaded from the RAM 42 again, based on which the map information with respect to the high-standard road segment of the entire area are updated. The next received difference data is sequentially loaded, based on which the map information with respect to the high-standard road segment of the entire area is updated. Then the process proceeds to S35 (see FIG. 9).

Thus, the map information of the entire area (e.g., Japan) is sequentially updated in a reliable manner at the predetermined time interval of T1 seconds (e.g., at the time interval of about 20 to 35 seconds) to allow the map having the high-standard road updated to be displayed on the liquid crystal display 25. Based on the map information, which has been sequentially updated, the route search and the like in the entire area may be performed.

For example, referring to FIG. 10A, if the difference data formed of the units of meshes each of 2.5 km×2.5 km to 10 km×10 km is received twice or more, the CPU 41 updates the map information of the entire area 53 to the map information of the latest version with respect to the high-standard road segment by the unit of the mesh of 2.5 km×2.5 km to 10 km×10 km at the predetermined time interval of T1 seconds. The updated high-standard roads 55, 56, 57 are displayed on the liquid display 25 so as to be distinguished from other roads. The route search in the entire area may be performed based on the thus updated high-standard roads 55, 56 and 57.

Referring to FIG. 9, in S35, the CPU 11 of the navigation apparatus 2 loads the destination data set in S31 from the RAM 42, and the area of XX km×XX km (e.g., about 30 km×30 about km) having the destination at the center is set as the predetermined area (second area) subjected to the updating of the map information so as to be stored in the RAM 42. The CPU 41 transmits the map difference updating request information (second area updating request information), which requires the difference data for updating the map information of the predetermined area (second area) of XX km×XX km having the destination at the center to the map information delivery center 3 via the communication unit 27.

Figure 10B:
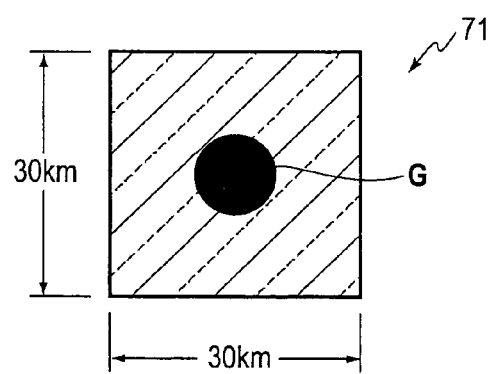
FIG. 10B is a diagram graphically showing the predetermined area having the destination at the center.

Referring to FIG. 10B, the CPU 41 sets the area with about 30 km×about 30 km having the destination G at the approximate center as the predetermined area 71 subjected to the updating of the map information so as to be stored in the RAM 42. Then the CPU 41 loads the point data of the destination G and the range information of the predetermined area 71 from the RAM 42, and transmits the map difference updating request information (second area updating request information), which requires the difference data for updating the map information of the area with about 30 km×about 30 km having the destination G at the approximate center, that is, the predetermined area 71 to the map information delivery center 3 via the communication unit 27.

Meanwhile, referring to FIG. 9, the CPU 11 of the map information delivery center 3 receives the map difference updating request information (second area updating request information) which requires the difference data for updating the map information of the predetermined area (second area) of XX km×XX km having the destination transmitted from the navigation apparatus 2 via the communication unit 16 of the center. The CPU 11 of the map information delivery center 3 loads the map version of the predetermined area (second area) of XX km×XX km having the destination at the center stored in the map information of the navigation apparatus 2 from the navigation updating historical information DB 15. Then the difference data (entire road segment updating information) including the updating information with respect to the entire road segment, that is, the high-standard road segment, general road segment and narrow street segment between map information of the map version and the map information of the latest version of the predetermined area (second area) with XX-by-XX km having the destination at the center stored in the updating map information 17 are extracted.

Referring to FIG. 10B, for example, the CPU 11 of the map information delivery center 3 loads the map version of the predetermined area 71 of about 30 km×about 30 km having the destination G at the approximate center from the navigation updating historical information DB 15 to extract the difference data (entire road segment updating information) including the updating information with respect to the entire road segment between the map information of the map version and the map information of the latest version of the predetermined area 71 stored in the updating map information 17.

In S217 to S220, the CPU 11 executes the same processing as in S112 to S115. In S218, if the data size of the difference data exceeds the maximum data size which allows the map information received by the navigation apparatus 2 to be updated within the predetermined time of T1 seconds (e.g., from about 20 to about 35 seconds) (S218: NO), the process proceeds to S219 where the CPU 11 divides the predetermined area (second area) of XX km×XX km having the destination at the center into meshes each of 2.5 km×2.5 km to 10 km×10 km. The difference data including the updating information with respect to the entire road segment is sequentially extracted by the respective meshes. The difference data is divided by the data size approximate to the maximum data size by the unit of the mesh so as to be stored in the RAM 12. Then in S220, the CPU 11 sequentially loads the difference data, which has been divided by the data size approximate to the maximum data size by the unit of the mesh, and delivers the difference data to the navigation apparatus 2 via the center communication unit 16.

In S36, the CPU 41 of the navigation apparatus 2 executes the same processing as in S13, as shown in FIG. 9. In S37, the CPU 41 loads the received difference data from the RAM 42 again. If the data indicates that no difference data exist, the process ends.

In S37, if the difference data is received only once, the difference data is loaded from the RAM 42 again, based on which the map information with respect to the entire road segment of the predetermined area (second area) of XX km×XX km (e.g., about 30 km×about 30 km) having the destination at the center is updated to end the process. As a result, the map of the predetermined area (second area) of XX km×XX km having the destination at the center becomes the map of the latest version, based on which the route search in the predetermined area (second area) of XX km×XX km having the destination at the center may be performed.

In S37, if the difference data is received by twice or more, the first received difference data are loaded from the RAM 42, based on which the map information with respect to the entire road segment of the predetermined area (second area) of XX km×XX km having the destination at the center is updated. Then the next received difference data is sequentially loaded, based on which the map information with respect to the entire road segment of the square area of XX km×XX km having the destination at the center may be updated. The process then ends.

Thus, the map information with respect to the entire road segment in the predetermined area (second area) of XX km×XX km having the destination at the center may be sequentially updated in a reliable manner at the predetermined time interval of T1 seconds (e.g., from about 20 to 35 seconds) and the updated map may be displayed on the liquid crystal display 25. The route search in the predetermined square area (second area) of XX km×XX km having the destination at the center may be performed based on the sequentially updated map information.

Referring to FIG. 10B, if the difference data formed of the units of meshes each of about 2.5 km×2.5 km to about 10 km×10 km with respect to the entire road segment are received twice or more, the CPU 11 sequentially updates the map information of the predetermined area 71 of about 30 km×about 30 km having the destination G at the center to the map information of the latest version by the unit of mesh of 2.5 km×2.5 km to 10 km×10km at the predetermined time interval of T1 seconds, and performs the route search and the like.

As described in detail above, in the exemplary map information delivery system 1, in the case where the accessory switch (ACC) is turned ON, or the ignition switch is turned ON to start the engine of the vehicle, that is, the navigation apparatus 2 is activated and the destination is not set, the CPU 41 of the navigation apparatus 2 divides the square area with XX3 km×XX3 km (e.g., about 100 km×about 100 km) having the registered home position at the center into the center segment area with the first priority of XX1 km×XX1 km (e.g., about 30 km×about 30 km) having the registered home position at the center, the first and the second outer peripheral segment areas each surrounding the outer periphery of the center segment area at the predetermined distance (e.g., about 30 km to about 40 km). The map difference updating request information (segment updating request information), which requires the difference data for updating the map information of the center segment area, the first outer peripheral segment area, and the second outer peripheral segment area in that order is sequentially transmitted to the map information delivery center 3 in the aforementioned order. The difference data including the updating information with respect to the entire road segment for updating the map information of the center segment area, the first outer peripheral segment area, and the second outer peripheral segment area, in that order, are received to update the map information to the latest version (S11 to S20, S111 to S125). After the updating, the CPU 41 transmits the map difference updating request information (high-standard road segment updating request information), which requires the difference data for updating the map information with respect to the high-standard road segment of the entire area (e.g., Japan) to the map information delivery center 3. Upon reception of the difference data for updating the map information with respect to the high-standard road segment of the entire area, the CPU 41 updates the map information into the latest version with respect to the high-standard road segment in Japan (S21 to S23, S126 to S130).

In the case where the engine of the automobile is started up, the map information delivery center 3 delivers the difference data including the updating information with respect to the entire road segment for updating each map information of the center segment area having the registered home position at the approximate center, the first outer peripheral segment area, and the second outer peripheral segment area sequentially, and updates each map information of the center segment area having the current vehicle position at the approximate center, the first outer peripheral segment area, and the second outer peripheral segment area in the navigation apparatus 2 to the map information of the latest version, respectively. This makes it possible for the user to receive the updating information in accordance with the state of the host vehicle at the start-up of the engine, allowing the delivery of the map of the latest version suitable for the intended use of the user. In the case where the vehicle travels from the registered home position toward the area outside the second outer peripheral segment area, the latest map information with respect to the high-standard road segment of the entire area, (e.g., Japan) becomes available, thus efficiently delivering the updating information of the map suitable for the intended use of the user.

In the case where the destination far from the current position by the predetermined distance or farther (e.g., 100 km or farther) is set in the navigation apparatus 2, the CPU 41 of the navigation apparatus 2 transmits the map difference updating request information (high-standard road segment updating request information) which requires the difference data for updating the map information with respect to the high-standard road segment of the entire area (e.g., Japan) to the map information delivery center 3. Upon reception of the difference data for updating the map information with respect to the high-standard road segment in the entire area, the CPU 41 updates the map information with respect to the high-standard road segment to the latest version (S31 to S34, S211 to S215). After the updating, the CPU 41 transmits the map difference updating request information (second area updating request information), which requires the difference data for updating the map information in the predetermined area with XX km×XX km (e.g., about 30 km×about 30 km) having the destination at the center to the map information delivery center 3. Upon reception of the difference data including the updating information with respect to the entire road segment for updating the map information of the predetermined area, the CPU 41 updates the map information to the latest version (S35 to S37, S216 to S220).

In the case where the destination far from the current position by the predetermined distance or farther is set in the navigation apparatus 2, the map information delivery center 3 delivers the difference data for updating the map information with respect to the high-standard road segment of the entire area. The map information with respect to the high-standard road segment in the navigation apparatus 2 may be updated to the latest version such that the route search with respect to the high-standard road to the destination is performed based on the map information of the latest version. This makes it possible to preferentially receive the updating information in accordance with the host vehicle state, for example, setting of the destination far from the current position, thus delivering the map of the latest version suitable for the intended use of the user. In the case where the vehicle arrives the destination, as the map information with respect to the entire road segment in the predetermined area of XX km×XX km having the destination at the center has been updated, the navigation apparatus 2 is allowed to perform the search around the destination based on the latest map information. The updating information of the map suitable for the use of the user may further be efficiently delivered.

If the data size of the difference data extracted for updating the map information of the navigation apparatus 2 exceeds the maximum data size which allows map information received by the navigation apparatus 2 to be updated within the T1 seconds (e.g., from about 25 to about 35 seconds) from the reception by the navigation apparatus 2, the map information delivery center 3 of the map information delivery system 1 divides the difference data into the data by the maximum data size so as to be sequentially delivered to the navigation apparatus 2. The navigation apparatus 2 loads the received difference data sequentially, based on which the navigation map information 38 is updated sequentially.

The navigation apparatus 2 is allowed to update the map information within the T1 seconds based on the received difference data at each reception thereof from the map information delivery center 3, resulting in quick delivery of the map information effective for the vehicle in the engine start-up state or in the traveling state.

While various features of this invention have been described in conjunction with the exemplary embodiments outlined above, various alternatives, modifications, variations, and/or improvements of those features may be possible. Accordingly, the exemplary embodiments of the invention, as set forth above, are intended to be illustrative. Various changes may be made without departing from the spirit and scope of the invention.

For example, in the case where the navigation apparatus 2 is activated and the destination is not set yet, the CPU 41 of the navigation apparatus 2 transmits the registered home position data, and the map difference updating request information (segment updating request information) around the registered home position to the map information delivery center 3. In the map information delivery center 3, the difference data for updating the respective map information with respect to the center segment area, the first outer peripheral segment area, and the second outer peripheral segment area are generated sequentially so as to be delivered to the navigation apparatus 2 sequentially by the respective segment areas. This makes it possible to reduce the processing load at the navigation apparatus 2.

The map information delivery center 3 may be structured to deliver the difference data for updating the respective map information with respect to the entire road segment of the respective segment areas, and then extract the difference data with respect to the high-standard road segment of the entire area (e.g., Japan) so as to be delivered to the navigation apparatus 2. This makes it possible to reduce the processing load on the navigation apparatus 2.

In the case where the destination far from the current position by the predetermined distance or farther (e.g., 100 km or farther) is set in the navigation apparatus 2, the host vehicle position data and the destination data are transmitted to the map information delivery center 3. In the map information delivery center, the difference data with respect to the high-standard road segment in the entire area are extracted so as to be delivered to the navigation apparatus 2. The map information delivery center 3 further generates the difference data for updating the map information with respect to the entire road segment in the predetermined area of XX km×XX km having the destination at the center so as to be delivered to the navigation apparatus 2. This makes it possible to reduce the processing load on the navigation apparatus 2.

In S15, the CPU 41 of the navigation apparatus 2 may transmit, to the map information delivery center 3, the data of the range of the first outer peripheral segment area, that is, the registered home position data and the boundary data representing the outer periphery of the first outer peripheral segment area (e.g., the area of about 60 km×about 60 km) as the map difference updating request information (segment updating request information). In the aforementioned case, in step 116, the CPU 11 of the map information delivery center 3 may extract the difference data for updating the map information in the first outer peripheral segment area from the area except the updated center segment area by setting the outer periphery of the first outer peripheral segment area is set as the outer boundary of the segment area.

In S18, the CPU 41 of the navigation apparatus 2 may transmit, to the map information delivery center 3, the data of the range of the second outer peripheral segment area, that is, the registered home position data and the boundary data representing the outer periphery of the second outer peripheral segment area (e.g., the area of about 100 km×about 100 km) as the map difference updating request information (segment updating request information). In the aforementioned case, in S121, the CPU 11 of the map information delivery center 3 may extract the difference data for updating the map information in the second peripheral segment area from the area except the already updated center segment area and the first outer peripheral segment area by setting the outer periphery of the second outer peripheral segment area as the outer boundary.

In S12, the area of XX3 km×XX3 km having the registered home position at the center (e.g., about 100 km×about 100 km) may be set as the predetermined area for updating the map information which is divided into three segment areas surrounding the registered home position, that is, the center segment area, the first outer peripheral segment area, and the second outer peripheral segment area. However, the predetermined area may be divided into three or more segment areas.

In S211, the difference data with respect to all the high-standard road in the entire area is extracted. However, the route search from the host vehicle position to the destination may be performed in the entire area based on the map information of the latest version so as to extract only the difference data with respect to the high-standard road segment on the route from the host vehicle position to the destination. This makes it possible to extract the difference data with respect to the high-standard road segment more efficiently when the destination is set.

What is claimed is:

1. A map information delivery system comprising:
   a navigation apparatus for a vehicle configured to update map information based on received updating information; and
   a map information delivery center configured to deliver the updating information to the navigation apparatus, wherein:

the navigation apparatus for the vehicle includes:
      a navigation side memory configured to store the map information and position data of a home that has been previously registered;
      a navigation side communication unit configured to communicate with the map information delivery center;
      a vehicle state detection unit configured to detect a state of the vehicle; and
      a navigation side controller configured to:
         when the state of the vehicle detected by the vehicle state detection unit is an engine start-up state, transmit updating request information including the position data of the home to the map information delivery center through the navigation side communication unit; and
         when the state of the vehicle detected by the vehicle state detection unit is in a destination setting state, transmit updating request information including position data of the destination to the map information delivery center through the navigation side communication unit, and
   the map information delivery center includes:
      a center side memory configured to store the map information including the updating information;
      a center side communication unit configured to communicate with the navigation apparatus; and
      a center side controller configured to:
         receive the updating request information from the navigation apparatus through the center side communication unit;
         when the received updating request information includes the position data of the home,
            set a first area having the position of the home at the center;
            extract the updating information with respect to an entire road segment corresponding to the first area;
            extract the updating information with respect to a high-standard road segment corresponding to an entire area of the map information; and
            deliver the extracted updating information with respect to the entire road segment corresponding to the first area and the extracted updating information with respect to the high-standard road segment corresponding to the entire area of the map information to the navigation apparatus through the center side communication unit, and
         when the received updating request information includes the position data of the destination,
            set a second area having the position of the destination at the center, the second area being smaller than the first area;
            extract the updating information with respect to the entire road segment corresponding to the second area;
            extract the updating information with respect to the high-standard road segment corresponding to the entire area of the map information; and
            deliver the extracted updating information with respect to the entire road segment corresponding to the second area and the extracted updating information with respect to the high-standard road segment corresponding to the entire area of the map information to the navigation apparatus through the center side communication unit.

2. A map information delivery center configured to deliver updating information of map information to a navigation apparatus, the map information delivery center comprising:
- a center side memory configured to store the map information including the updating information;
- a center side communication unit configured to communicate with the navigation apparatus; and
- a center side controller configured to:
  - receive updating request information requesting the updating information of the map information from the navigation apparatus through the center side communication unit;
  - when the received updating request information includes position data of a home that has been previously registered on the navigation apparatus,
    - set a first area having a position of the home at the center;
    - extract the updating information with respect to an entire road segment corresponding to the first area;
    - extract the updating information with respect to a high-standard road segment corresponding to an entire area of the map information; and
    - deliver the extracted updating information with respect to the entire road segment corresponding to the first area and the extracted updating information with respect to the high-standard road segment corresponding to the entire area of the map information to the navigation apparatus through the center side communication unit, and
  - when the received updating request information includes position data of a destination that has been set on the navigation apparatus,
    - set a second area having a position of the destination at the center, the second area being smaller than the first area;
    - extract the updating information with respect to the entire road segment corresponding to the second area;
    - extract the updating information with respect to the high-standard road segment corresponding to the entire area of the map information; and
    - deliver the extracted updating information with respect to the entire road segment corresponding to the second area and the extracted updating information with respect to the high-standard road segment corresponding to the entire area of the map information to the navigation apparatus through the center side communication unit.

3. A navigation apparatus for a vehicle configured to update map information based on updating information received from a map information delivery center, the navigation apparatus for the vehicle comprising:
- a navigation side memory configured to store the map information and position data of a home that has been previously registered;
- a navigation side communication unit configured to communicate with the map information delivery center;
- a vehicle state detection unit configured to detect a state of the vehicle; and
- a navigation side controller configured to:
  - when the state of the vehicle detected by the vehicle state detection unit is an engine start-up state:
    - transmit updating request information including the position data of the home to the map information delivery center through the navigation side communication unit;
    - receive the updating information with respect to an entire road segment corresponding to a first area having a position of the home at the center and the updating information with respect to a high-standard road segment corresponding an entire area of the map information; and
    - update the received updating information with respect to the entire road segment corresponding to the first area and the received updating information with respect to the high-standard road segment corresponding to the entire area of the map information; and
  - when the state of the vehicle detected by the vehicle state detection unit is in a destination setting state:
    - transmit updating request information including position data of the destination to the map information delivery center through the navigation side communication unit;
    - receive the updating information with respect to the entire road segment corresponding to a second area having a position of the destination at the center and the updating information with respect to the high-standard road segment corresponding to the entire area of the map information, the second area being smaller than the first area; and
    - update the received updating information with respect to the entire road segment corresponding to the second area and the received updating information with respect to the high-standard road segment corresponding to the entire area of the map information.

* * * * *